Dec. 23, 1958 R. S. CARUTHERS 2,866,000

CARRIER COMMUNICATION SYSTEM

Filed Sept. 28, 1953 3 Sheets-Sheet 1

INVENTOR.
ROBERT S. CARUTHERS
BY
Lippincott & Smith
ATTORNEYS

Dec. 23, 1958 R. S. CARUTHERS 2,866,000

CARRIER COMMUNICATION SYSTEM

Filed Sept. 28, 1953 3 Sheets-Sheet 2

INVENTOR.
ROBERT S. CARUTHERS
BY Lippincott & Smith
ATTORNEYS

Dec. 23, 1958 R. S. CARUTHERS 2,866,000

CARRIER COMMUNICATION SYSTEM

Filed Sept. 28, 1953 3 Sheets-Sheet 3

INVENTOR.
ROBERT S. CARUTHERS
BY
Lippincott & Smith
ATTORNEYS

United States Patent Office 2,866,000

Patented Dec. 23, 1958

2,866,000

CARRIER COMMUNICATION SYSTEM

Robert S. Caruthers, Palo Alto, Calif., assignor to Lenkurt Electric Co. Inc., San Carlos, Calif., a corporation of Delaware Application September 28, 1953, Serial No. 382,689

6 Claims. (Cl. 179—15)

This invention relates to carrier frequency communication apparatus for the simultaneous transmission of signals in a plurality of channels, each of the same nominal width. While the invention can be applied to the carrier transmission of signals of various types, including telemetering signals, telegraph signals, and the like, it is primarily adapted for carrier telephony.

Among the objects of the invention are to provide carrier communication apparatus which is at the same time inexpensive enough to produce and install on short-haul telephone circuits and is well enough compensated against distortion of all types to be applicable to long-haul toll circuits; to provide carrier communication apparatus requiring a minimum number of types of components and sub-assemblies of such components; to provide carrier communication apparatus of sufficient flexibility so that it may be adapted to existing lines which may not have been orginally constructed and transposed for best operation on the frequencies employed, but which, by minor modification of the terminal equipment, can be made to carry the signals developed thereby within acceptable limits of distortion, attenuation, and signal-to-noise ratio; to provide carrier communication apparatus which is comprised of identical modular units at transmitting and receiving ends of the various circuits involved; to provide carrier communication apparatus which, while differing in construction and methods of operation from systems now in common use, can be operated in conjunction with such systems, and either superimposed on presently existing systems or can be connected in tandem with such presently existing systems to form additional links extending such systems to areas not theretofore reached thereby; to provide apparatus of the type mentioned which can be interconnected, either with such pre-existing systems as have been referred to or with radio links, without demodulating the signals to voice frequencies and then remodulating back up to carrier frequency bands; to provide equipment of the character described which is equally applicable to transmission over open wire, cable, or radio circuits or to the interlinkage of such circuits through the use of a minimum of additional equipment; to provide apparatus which is adapted for use in systems employing such additional devices as companders and repeaters, automatic gain controls of both the "slope" and "level" correction type, and inherently develops any necessary auxiliary signals for the operation of such devices; to provide apparatus of the character described which is basically of simple construction and circuitry and involves a minimum of switching and translating equipment in order to allot the signals from the various separate channels wherein they are initiated to desired respective bands with their component frequencies represented by waves of the single sideband type wherein the order of the component frequencies is either erect or inverted as may be desired; to provide carrier communication apparatus wherein the types of filters employed are not only small in number but are also relatively inexpensive to build with adequate precision and at the same time are effective enough to be used in wide-band, long-haul systems; and to provide carrier equipment adapted for use in "expansible" systems, wherein small groups of speech channels can be added from time to time as the necessity for additional channels arises, up to the maximum frequencies which the lines to which the systems are connected can carry.

The broad concept of the present invention comprises the provision of substantially identical modular units which can be combined, successively, into pre-groups, groups, and super-groups by the addition of a minimum amount of additional equipment as successive combinations are made. In accordance with the invention means are provided for developing a plurality of carrier frequencies which are separated successively by the nominal width of one communication channel. As here used, the term "nominal width" of a channel includes the actual band width of the speech or other intelligence to be carried plus any signalling or auxiliary message width and a guard band to prevent interference with the next channel. The number of carrier frequencies thus provided exceeds by one the number of channels which are to be combined in a pre-group. In equipment as actually constructed each pre-group includes four channels, and therefore in accordance with the invention five carrier frequencies are provided, separated by four kilocycles in accordance with standard practice for separation of voice channels. The terminal equipment for modulation and demodulation is to a large extent identical. Each voice frequency channel connects to the modulator and demodulator, which are preferably, although not necessarily of the double-balanced type. The carrier frequency sides of the modulator and demodulator units connect to filters having a pass-band of the nominal channel width and including the band between two adjacent carrier frequencies. Preferably the channel units are made identical and the filters are of the plug-in type, so that any unit can be used for any channel by mere substitution of filters. Switching means are provided for connecting each modulator or demodulator to either the carrier at the upper edge of the band passed by the filter to which that modulator is connected or to the carrier which is at the lower edge of the same band. It is convenient, for the purpose of such switching, to make the switches of the plug type, plugs being provided which will connect all of the units of the group to either the lower or the upper carriers as the case may be. All of the filters of each group connect to a common carrier-frequency circuit. Each carrier group can be modulated, as a group, on a different carrier frequency so chosen that one sideband (usually the lower) of the resultant modulation falls in a successive portion of the spectrum and the sidebands of the various pre-groups are placed successively to form a substantially continuous band. Again the modulation and demodulation group units are made identical. Thus three pre-groups of four channels each require three different filters in order to combine them into a base group channel, twelve voice channels wide. Twelve-channel groups are customary in telephone practice, and on open wire lines are frequently used with one frequency band employed for east-west transmission and another for west-east transmission. For this purpose an entire twelve channel group can be remodulated on a still higher frequency carrier and utilized for transmission in, say, the east-west direction while the original base group frequency is used for west-east transmission. Alternatively, for use on cables where east-west and west-east channels are quite frequently in separate cables, the higher frequency group can be added to the lower frequency base group to form a super-group. For coaxial lines or radio relay purposes super-groups can be combined by further modulation and demodulation in the same manner; systems have been designed wherein five twelve-channel groups have been combined into super-groups of sixty channels and five such sixty-channel super-groups combine to give a "super-super" group of three hundred channels, the individual channels, the pre-groups, the group, the super-group equipment being identical for all channels.

Use of successive sub-carriers is not new; the advantage of the present invention lies in the arrangement of the pre-group equipment. This arrangement has properties which may not at first sight be apparent. These features stem from the fact that with the same equipment, using the same filters, a single modulation process provides signals in the pre-group channels which may be, at will, those represented by either erect or inverted sidebands; i. e., the lowest frequencies on the original voice channel may be represented by either the lowest or the highest frequencies in the modulated band. These sidebands remain in their same order through successive modulations. The channels may be "frogged" at repeater points as often as desired, the bands may be inverted or re-inverted, and which ever way they happen to lie at the receiving end of the system a simple switching operation will deliver each message into its proper channel in intelligible form. Furthermore, if it becomes necessary to connect a system in accordance with this invention with a system using, for example, sub-groups wherein four channels are modulated on two carriers, each pair of channels being represented respectively, by the upper and lower sidebands of a common carrier, using the plug method of switching it is a simple matter to adapt the equipment to receive signals of this type. Furthermore, since better transmission and lower cross-talk in adjacent circuits are obtained by inverting sidebands in some circuits while erect sidebands are used in others, the provision of two plug switches, one arranged to connect the upper-edge carriers and the other the lower-edge carriers to the respective modulators and demodulators enables the proper connections to be immediately and instantaneously made; equipment at both ends of the circuit being identical, the only difference in the equipment at the two ends of the circuit is that the two plugs are interchanged with respect to the units through which they are connected.

There are other objects and advantages of the system which will become apparent in the detailed description of a preferred embodiment which follows, taken in connection with the accompanying drawings, wherein:

Fig. 1 is a block diagram of a terminal for use with the carrier system employing the present invention. In this diagram one unit at each step is broken down into component blocks whereas the corresponding units, duplicating that shown in detail, are shown as single blocks with only the interconnections between similar blocks indicated in full.

Figure 1:
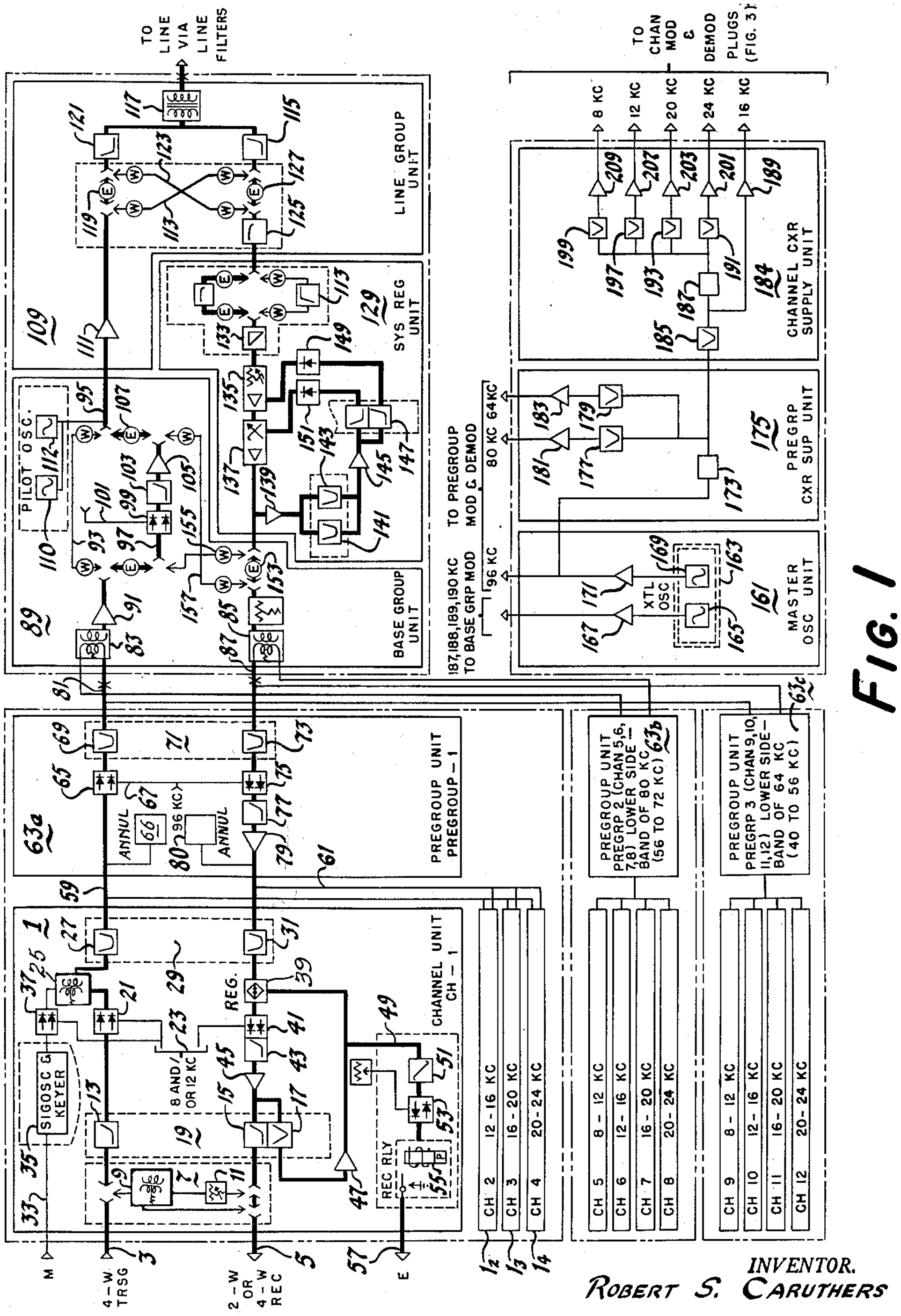
Fig. 1 is a block diagram of a two-way carrier system, one pre-group being illustrated in full and the connection for other pre-groups indicated, and the connections for groups and super-groups (if desired) also shown.

Block 1 illustrates a complete channel unit including modulator, demodulator, and signalling equipment. The unit illustrated is that for "channel 1" and, as has been indicated, differs from those of the other channels only in the pass-bands of its filters. In the description specific frequencies will be designated as supplied to this and the other units mentioned, but it is to be understood that these frequencies are adopted only because they are within the limits of accepted practice and are those used in the particular system described and are not to be considered as in any way limiting, since the same principles can be used for entirely different carrier, signalling, and pass-band frequencies.

Lines 3 and 5 are for connection to the usual switchboard equipment, which may be either of the ring-down or dial type. This particular system is designed for four-wire transmitting connections and either two- or four-wire connections from the demodulator to the receiving side of the voice channel. The switchboard connections may be combined in a hybrid unit 7 if desired, employing a resistance hybrid 9; when the connection is so made the resistance pad 11 is included between the outgoing line and the board to regulate the level at which the signals are fed to the latter.

The lines to and from the board each connect through a low-pass filter, 13 and 15 respectively, having a cut-off at the upper limit of the voice channel, here assumed as 3.2 kc. These filters, together with a narrow band-pass filter 17, adapted to pass a band of 3400 to 3550 cycles which is used in this system for signalling and pilot purposes, can conveniently be assembled in a single plug-in unit 19, these units being identical for all channels. Output transmitting filter 13 connects to one input circuit of a balanced crystal-diode modulator 21 which may be connected, by means of a plug-switch 23 later to be described, to either an eight or twelve kilocycle carrier supply. The third circuit of the modulator is connected, through either a resistance- or transformer-type hybrid 25, with a channel filter 27 having a pass-band of 8 to 12 kc. As in the case of the filters 13 and 15, this filter is conveniently mounted in a single plug-in unit 29 with an identical receiving filter 31.

The signalling circuit for either dialing or ring-down circuits connects from the board through a lead 33 to a signalling oscillator and keyer 35. This oscillator and keyer is adapted to supply frequency-shift signals of 3400 and 3550 cycles in response to signalling impulses of the usual type from the board. This unit, like all of the others with the exception of the filters comprised in the plug-in unit 29, is the same in all channels. The output of the oscillator and keyer 35 is fed to a modulator 37, which is the same type as is used for the voice-frequency signal, and the resultant modulation is fed through the resistance hybrid 25 to a band-pass filter 27.

On the receiving side of the unit, the connections from the filter 31 lead first to a variable losser or other regulator unit 39 and thence to a demodulator 41, identical in construction with the modulator 21, and thence through a low-pass filter 43 for removing the upper sideband generated in the demodulation process. Filter 43 has a high enough cut-off to accept the 3400 to 3550 signalling frequencies. From filter 43 the signals are supplied to an amplifier 45 which connects to the junction of filters 15 and 17. Filter 17 selects, from the combined signals, the signalling frequencies. Its output circuit connects to an amplifier 47 which feeds a portion of the signalling frequencies back to the regulator 39. Another portion of the 3400–3550 signals pass through a branch lead 49 to a frequency discriminator 51, and thence to a biased rectifier 53. The output of the latter feeds a receiving relay 55, operation of which re-creates either the dialing pulses or the ringing signals from the remote end of the line and feeds them through output lead 57 back to the switchboard.

Units $\mathbf{1}_2$, $\mathbf{1}_3$ and $\mathbf{1}_4$, comprising the remaining three units of the pre-group, are identical with the unit 1, already described, except for the fact that the filters which correspond to filters 27 and 31 of the first channel pass bands respectively of 12 to 16 kc., 16 to 20 kc., and 20 to 24 kc. Any unit can therefore be converted to work on any channel of the pre-group or of any other pre-group by the simple substitution of the proper filters in the plug-in unit 29. The outputs of all of the filters 27 are connected in multiple to a lead 59 while inputs of the filters corresponding to filter 31 are connected in multiple to a lead 61. Together the filters of each sub-group are therefore adapted to supply to the common leads 59 or to accept from the common leads 61 a substantially continuous band of frequencies between the limits of 8 and 24 kc.

Leads 59 and 61 connect to the transmitting and receiving equipment respectively of a pre-group unit 63. Lead 59 connects to one of the circuits of a balanced crystal-diode modulator 65. An annulling network 66 connects to leads 59 in order to give the filters at the edges of the 8–24 kc. band of the channel units the same cut-off characteristics as those having filters with adjacent pass-bands on both sides connected in multiple therewith. A second circuit of modulator 65 is supplied with a carrier wave, having a frequency of 96 kc., from a circuit 67. This is combined with the 16 kc. band from the four channel subgroups, to develop upper and lower sidebands 16 kc. wide, and the modulation products resulting are fed to a band-pass filter 69 which selects the lower sideband of from 72 to 88 kc.

Like the filters 27 and 31, filter 69 is preferably mounted in a common plug-in unit 71 with an identical receiving filter 73. Incoming signals passing this filter supply a demodulator 75, identical with modulator 65 and supplied with the same carrier frequency from lead 67. From the demodulator the output frequencies of from 8–24 kc. are selected by low-pass filter 77, amplified by an amplifier 79, and so passed to the common lead 61 connecting to the various channel units of the subgroup. An annulling network 80, identical with network 66, in connected between amplifier 79 and the channel units.

Signals from filter 69 of pre-group unit **63*a* are combined with those in pre-group 63*c* by direct multiple connection to a common circuit 81. The signals from pre-group unit 63*b* are added to the signals of the other two pre-group units through a junction hybrid 83, which isolates the signals in each unit from those of the unit in the immediately adjacent band sufficiently to permit the use of economical overlapping filters in all units and avoid the necessity for using more expensive filters of the crystal type having sharper cut-offs. The same connection system is used on the receiving side of the circuit, where unit 63*b* is separated from those on either side by means of the junction hybrid 85, leads from units 63*a* and 63*c* being connected directly in multiple to a common lead 87**.

Figure 4:
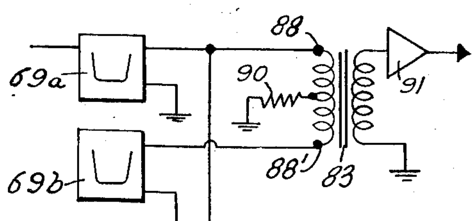
Fig. 4 is a fragmentary schematic diagram illustrating the connections between a number of pre-groups and a base group.

The connection of the filters of the pre-groups to the junction hybrids is shown more clearly in Fig. 4, which illustrates the connections of transmitting filters 69 of the units **63*a*, 63*b*, and 63*c*, the filters in these units being designated by the same subscripts. One terminal of the center-tapped winding 88 of the differential transformer 83 connects to the ungrounded side of filters $69_a$ and $69_c$. The other terminal 88' connects to the output of filter $69_b$. The center tap of the winding connects to ground through a resistor 90, which serves as the balancing network for the differential transformer, while the common output winding of this transformer connects to amplifier 91 of the base group unit. This arrangement is illustrative of the connection of a differential transformer or hybrid of the unbalanced type. Equivalent connections of balanced hybrids are well known in the art. The connections of the transformers 73 to junction hybrids 85** are identical.

The junction hybrids 83 and 85 are both included in a base group unit 89. From hybrid 83 signals pass to an amplifier 91. From this point their path depends upon whether the group is to be used for "west to east" signalling, utilizing the frequencies, as developed in the preceding unit, directly, or whether they are to be remodulated into a higher band for "east to west" transmission. In the former case the signals are switched to a lead 93 and thence to an output lead 95. If the signals are to be remodulated into the "east to west" band they are switched from the amplifier 91 to a line 97 feeding a modulator-demodulator unit 99 of the same type as has already been described, where they are intermodulated with frequencies of 187, 188, 189 or 190 kc., depending upon the particular modulation plan utilized in a specific communication system. From the modulator 99 the lower sideband is selected by a low-pass filter 103, reamplified in an amplifier 105, and thence connected through switch 107 to the output line 95 and so to a line group unit 109.

Before reaching the line-group unit, two pilot signals are injected from a pair of pilot oscillators 110 and 112. For west-east transmission the pilot frequencies used are within the base-group band at 80 and 40 kc. respectively. For east-west transmission they are 150 and 99 kc. respectively in the illustrative system.

In the line-group unit the signals are reamplified in a transmitting power amplifier 111. For "west-east" transmission, where the signals are in the lower group of from 40–88 kc., they are switched through leads 113 to a low-pass filter 115, and thence through a transformer 117 to the line, via the usual line filters if other channels of voice or lower carrier frequencies are employed on the same line, as is usual. If the signals have been shifted to the higher band of from 99 kc. upward, they are switched through leads 119 to a high-pass directional filter 121 and so to the transformer 117 and the line. Signals received from the line pass through the transformers 117 and either filter 121 or 115, depending upon the direction from which they are received at the unit under consideration. If the equipment is at the "west" end of the line the high band of signals passing filter 121 is switched through leads 123 to a line-filter equalizer 125, whereas if the equipment is at the "east" end of the line the signals reach the equalizer 125 through a roof filter 115 and lead 127. In either case the signals then pass to a system regulator generally designated as 129.

Here again what happens to the signals depends upon whether the terminal is used as an east or a west terminal. If the latter, the signals pass through a circuit including a low-pass filter 131 and a line equalizer 133 to the line regulator proper. This comprises two units, a "flat" regulator 135 and a slope regulator 137. Each of these regulators is a variable gain amplifier or combined amplifier-losser. In the flat regulator the over-all gain or loss is uniform throughout the band treated; in the slope regulator the gain at one end of the band is varied, while that at the other end of the band remains substantially constant. Various types of regulators of this general character exist; that preferred is described in a copending application Serial No. 269,806, filed January 29, 1952, of Kurt E. Appert.

From the output of the slope regulator a portion of the signal passes through a high-gain amplifier 139 and thence to a pair of narrow band-pass filters, 141 and 143, connected in parallel. There filters are preferably mounted in plug-in units like the others already described, and pass, respectively, the pilot signals injected into the circuit by oscillators 110 and 112; 40 and 80 kc. respectively if the received signals are in the lower base group or 99 and 150 kc. respectively at the west terminal. After passing the filters the two pilot signals are again combined at the input of an amplifier 145. After amplification the pilot signals are again separated by a filter set 147, which may be of the simpler high- and low-pass type rather than the narrow band-pass filters used in the input of the regulating amplifier. At the west terminal and in east-west repeaters the lower frequency signals pass through a rectifier 149 to develop a control voltage for regulating the flat gain. The higher of the two pilot frequencies is rectified by rectifier 151 and controls the gain of the slope regulating amplifier 137. In west-east direction repeaters and at east terminals the higher frequency pilot controls the flat gain.

If the received signal is in the lower band it is switched through connection 153 directly to junction hybrid 85. If it is in the higher band it is switched through connection 155 to lead 97, and thence to the modulator-demodulator 99 where it is shifted back to the low band, and then switched through connection 157 to the junction hybrid 85.

Through this arrangement it will be seen that identical units, with the exception of the pilot oscillators and the plug-in filters, are utilized in the system irrespective of whether the upper or lower of the two base groups are used for transmission or reception. A minimum number of different types of unit are employed and only very simple switching arrangements need be used.

To supply the various modulating frequencies it is preferable to employ means for deriving all of the modulating frequencies required from a minimum number of sources. In the apparatus which has been chosen for detailed description, however, two sources are used. Both are included in a master oscillator unit 161.

This unit is provided with a crystal oven 163 for maintaining two crystals at constant temperature. One crystal, 165, provides the frequency required for developing the carrier wave upon which the base frequencies are modulated to translate them into the upper band; 187, 188, 189, or 190 kc. as the case may be. The frequency of the waves so developed is raised to the proper level in an amplifier 167 and fed to modulator or demodulator 99. The second crystal 169 provides a wave of 96 kc. which, after its level is raised and an amplifier 171, is fed in part to lead 67 to supply the pre-group unit 63*a*. The 96 kc. wave is also fed to a frequency divider 173 in a pre-group carrier supply panel 175 and from it, by a process of intermodulation, frequencies of 80 kc., 64 kc. and 16 kc are derived. Other methods of deriving these frequencies can, of course, be used, but in the particular equipment here described it is preferred to employ the intermodulation method as described in a copending application of Norman Epstein, Serial No. 345,616, filed March 30, 1953. Within the carrier supply unit are narrow band-pass filters 177 and 179 which select the 80 kc. and 64 kc. frequencies respectively. These frequencies are fed to amplifiers 181 and 183, wherein they are amplified and used to provide carriers for pre-group units 63*b* and 63*c* respectively.

A 16 kc. frequency from the unit 175 is supplied through a band-pass filter 185, to a second frequency divider, of the same general type as a divider 173, the output of which develops the pre-group carrier frequencies of 8, 12, 20, and 24 kc. A portion of the 16 kc. wave passed by filter 185 is supplied directly to an amplifier 189 and thence to the various channel units. The other frequencies developed by the divider 187 are selected by filters 191, 193, 197 and 199 and thence through amplifiers 201, 203, 207, and 209, are supplied to all of the channel units of the system.

Figure 3:
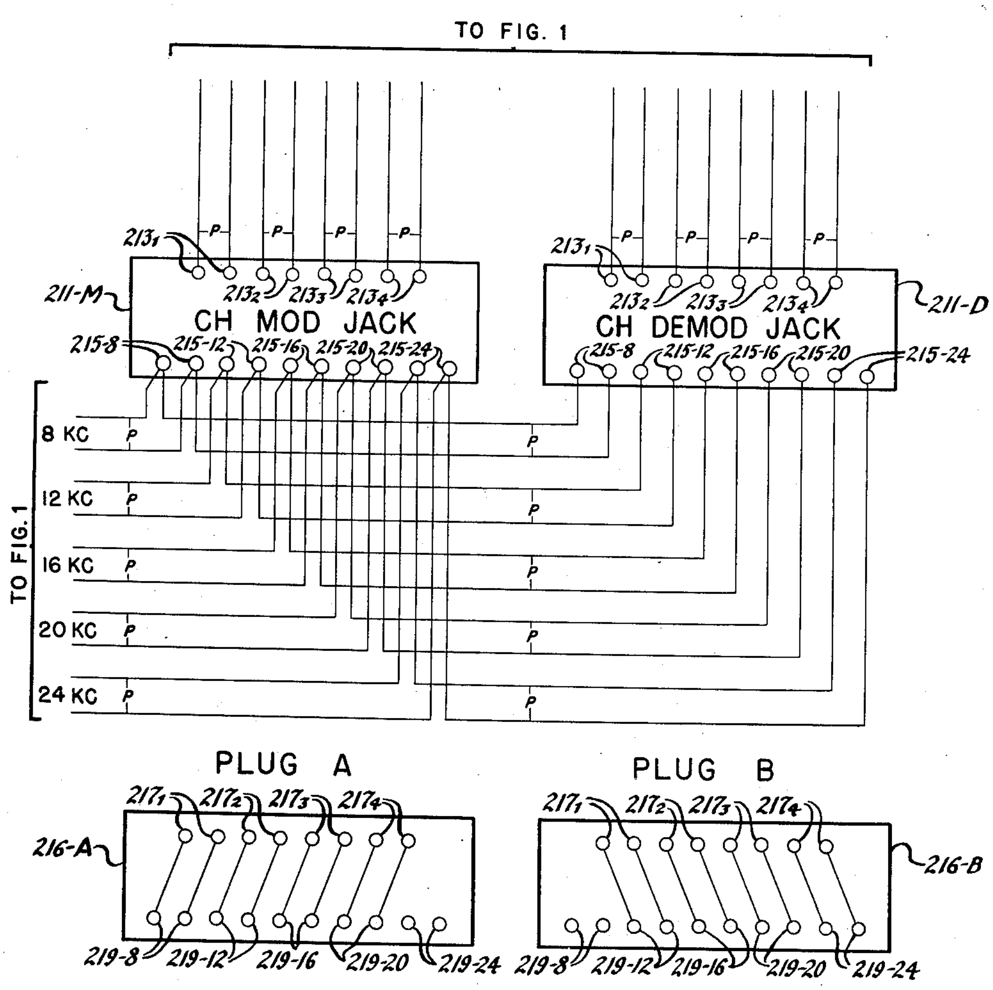
Fig. 3 is a connection diagram illustrating the plug-switching arrangement for the modulator and demodulator units of a pre-group.

As should be apparent from what has been already stated, one of the primary advantages of the arrangement described is the ease with which the various channel units can be converted from upper to lower sideband operation and vice versa. The switching to accomplish this is ordinarily and preferably accomplished for the entire base group of 12 channels for both transmission and reception. The preferred method of switching is illustrated in Fig. 3. For this purpose two multiple-pin jacks, 211–M and 211–D are provided. These jacks are identical, and as shown in the figure each is provided, at the top, with four pairs of socket contacts $\mathbf{213}_1$ to $\mathbf{213}_4$. Leads to these socket terminals connect, respectively, to the leads 23 in the channel unit bearing the corresponding subscript, the pair of leads from jack 211–M being connected to supply the modulator and those from 211–D to the demodulator in each case. A lower row of pairs of socket connections, designated as 215–8, 215–12, 215–16, 215–20 and 215–24, is also provided for each jack, and the carrier-frequency leads from the channel supply unit 184 are multipled to the pairs of sockets designated by the reference character which bears the added figure corresponding to the frequency developed in the channel.

Switching is accomplished by inserting into these jacks plugs bearing pins which correspond to the respective sockets, an upper row of pairs of pins designated as $\mathbf{217}_1$ to $\mathbf{217}_4$ mate with the sockets bearing the corresponding subscripts in either jack. The plugs bear a lower row of pairs of pins, 219–8 to 219–24 mating with the lower row of sockets in the jacks. The plugs carry cross connections between the pairs of pins in the upper and lower rows. In plug 216–A the first pair of pins on the left of the lower row is connected to the first pair on the left on the upper row and successive pairs of pins in both rows are connected, while in plug 216-B the first pairs of pins at the right of each row are connected, with adjacent connections between the successive pairs of pins in the two rows. This leaves one pair of pins in the lower row of each plug unconnected; the pair on the right in plug 216–A and the pair on the left in plug 216–B.

Accordingly insertion of plug 216–A in jack 211–M will result in the modulation of incoming voice frequencies on the upper sidebands of the successive carriers while the insertion of plug 216–B in jack 211–D will demodulate the inverted sidebands of the incoming carrier frequency signals to give intelligible voice. Reversal of the position of the plugs will reverse the operation and set up lower sidebands in the modulator and for upper sidebands in the demodulator.

In case it is desired to tie-in the apparatus to a system using a different modulation plan special plugs can be connected for the purpose. For example pins 219–12 can be connected to both pins $\mathbf{217}_1$ and $\mathbf{217}_2$ and pins 219–20 can be connected to both pins $\mathbf{217}_3$ and $\mathbf{217}_4$ to modulate channels 1 and 2 on the lower and upper sidebands respectively of the 12 kc. carrier while channels 3 and 4 are modulated respectively on the lower and upper sidebands of the 20 kc. carrier. Other combinations can be used by the simple interconnection or strapping together the various pins and plugs provided for the purpose. The result is a system of unusual flexibility.

Figure 2:
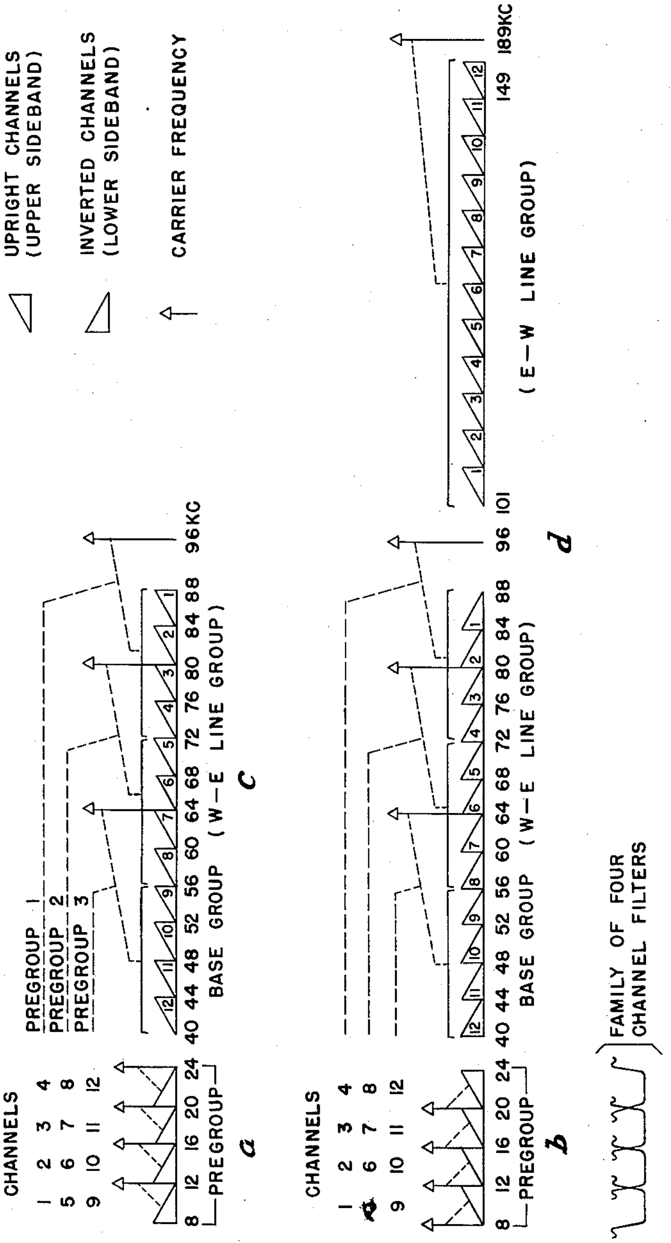
Fig. 2 is a diagram showing the modulation plan of a two-way carrier system embodying the invention as used on open wire lines.

Fig. 2 is a schematic representation of a characteristic plan, indicating, in kilocycles, the allocation of the various channels, the carrier frequencies supplied, and the sidebands selected, whether erect or inverted. Legends on the drawing indicate the symbols used, vertical lines indicating the location of the carrier frequencies and triangles indicating the sideband frequencies allocated to the various channels. A triangle slanting downward to the left indicates erect sidebands while one slanting downward to the right represents an inverted sideband. Dotted lines from the channel carrier frequencies or from brackets including the channels allocated to these frequencies shows the carriers on which the successive modulations occur.

Diagram *a* of the figure shows one pregroup of 4 channels modulated on the upper 4 of the channel carriers, resulting in the selection of the lower inverted sidebands. Diagram *b* shows a pregroup modulated on the lower 4 carriers. Diagram *c* indicates how modulation in the pregroup units reinverts the sidebands so that the originally inverted pre-groups form a substantially continuous base-group band with sidebands erect. Diagram *d* indicates inverted sidebands in the base-group resulting from the remodulated pre-groups of diagram *b*, plus the result of translation into the "east-west" band.

The outstanding feature of the modulation plans possible with the system of this invention is that the first channel-modulation definitely fixes the position of the channel in the modulation scheme and whether the sidebands are erect or inverted. After the first modulation each successive modulation is on a carrier of a frequency such that a lower sideband is selected, inverting or reinverting the sidebands. After the pre-group modulation each channel in each group undergoes the same number of modulation in order to fit it into the band allotted to a particular direction of transmission. While this specification has not dealt in detail with repeater or with other terminal equipment, if, at any repeater, the two line-groups shown in diagram *d* of Fig. 2 are remodulated on a 189 kc. carrier the allocation of the channels, W–E and E–W, will be interchanged, "frogging" the signals. Such frogging can be done as often as desired in a long line, and by mere selection of the proper plugs 216–A or 216–B for insertion into the jacks 211–M or 211–D the channel frequencies will be properly located at the receiving end of the line. There is no danger of finding that a message transmitted on channel 1 may appear at the receiving end on channel 4 or that channels 1 and 2 are similarly interchanged, as may happen in systems where the upper and lower sidebands of a single carrier are utilized to carry to different channels.

The same system of building up wider frequency bands for coaxial cable transmission or radio relay can be carried on indefinitely, as has already been suggested. The system lends itself to automatic frequency control of the carrier through the use of pilot oscillations from oscillators 110 or 112, as is described in the copending application of the present inventor, Serial No. 358,274, filed May 29, 1953, and also to individual channel gain regulation through the use of the frequency shift signalling oscillations as a pilot, as is described and claimed in a separate application.

Accepted techniques on minimizing cross-talk where a plurality of carrier systems of this type are employed on different pairs of the same pole line can readily be employed, "NA," "NB," "SA," and "SB" modulation plans are available by the choice of 188 kc., 189 kc., 187 kc. or 190 kc. to perform the final modulation which converts the base group modulation and transfers it to the upper frequency band and this merely requires choice of one of four crystals 165 for insertion in the oven 163.

It should be obvious that the system is not limited to the allocations mentioned or to voice frequency channels. Thus it is quite possible to use the same general plan in imposing a group of telegraph channels on a single voice channel, and the voice channel in turn can be handled on one channel of the system as already described. Furthermore, the four-channel pre-group can be modulated on practically any frequency desired to place the group in a band other than in the 40 to 88 kc. band that has been described in detail. Individual frequencies, band widths, or channel orders which have been used in the description of the invention are intended to be illustrative merely and not as limiting, all intended limitations being expressed in the following claims.

What is claimed is as follows:

1. Carrier communication apparatus for the simultaneous transmission of signals in a plurality of channels of the same nominal width which combined form a substantially continuous band, comprising means for developing a plurality of carrier waves of frequencies which differ successively by the nominal width of said channels and the number of said carrier waves exceeding by one the number of channels, a plurality of modulators each having three pairs of terminals, an individual pair of channel leads connected to one of said pairs of leads, a filter having a pass-band of the width of one channel and including the band between the frequencies of an adjacent two of said carrier waves connected to a second of said pairs of terminals, and means connected to the third of said pairs of terminals for switching to each modulator a carrier wave which is optionally either the one at the low-frequency or the high-frequency end of the pass-band of the filter to which the respective modulator is connected.

2. Carrier communication apparatus for the simultaneous transmission of signals in a plurality of channels of the same nominal width which combined form a substantially continuous band, comprising means for developing a plurality of carrier waves of frequencies which differ successively by the nominal width of said channels and the number of said waves exceeding by one the number of channels, a pair of substantially identical modulating-demodulating units comprising a plurality of modulators each having three pairs of terminals, an individual pair of channel leads connected to one of said pairs of terminals, a filter having a pass-band of the width of one channel and including the band between the frequencies of an adjacent two of said carrier waves connected to a second of said pairs of terminals, and means connected to the third of said pairs of terminals for simultaneously switching to each of the modulators of one of said units a carrier wave which is optionally at either the low-frequency or the high-frequency end of the pass-band of the filter to which the respective modulator is connected and to each of the modulators of the other of said units a carrier wave which is at the opposite end of the pass-band to that supplied to the corresponding modulator of said one unit.

3. Carrier frequency communication apparatus comprising a plurality of pregroups of channel units, each pregroup comprising a plurality of substantially identical channel units each including a modulator, a demodulator and means for connecting both the modulator and the demodulator to a low frequency circuit, means for connecting both the modulator and the demodulator to a carrier-frequency circuit including in series therebetween filters having the same pass-bands of channel width in the individual channel units, the pass-bands of the filters in successive channel units passing adjacent bands to collectively pass a substantially continuous spectrum, and means for supplying to the modulator and demodulator of each unit concurrently carrier-frequency waves one of which is at substantially the lower limit of the frequency band passed by the filters in the respective channel units and the other of which is substantially at the higher limit of the frequency band passed by the filters in the respective unit channel, and each said pregroup including an equal number of channel units provided with filters and subcarrier frequencies to receive from and supply to said carrier frequency circuits bands of frequencies within the same frequency spectrum, means for developing a plurality of carrier frequencies differing by the width of the frequency spectra of said pregroups, and a plurality of pregroup units each including a modulator and a demodulator both of which are connected to be supplied by the same one of said last-mentioned carrier frequencies, each of said pregroup units being supplied by a different one of said last-mentioned carrier frequencies, the modulators of said pregroup units each having an input circuit connected to the carrier-frequency circuit of an individual pregroup and an output circuit common to all of said pregroup units and the demodulators of all of said pregroup units having an input circuit connected to a common circuit and each of said demodulators having an output circuit connecting to a common input carrier-frequency circuit of an individual pregroup, and switching means common to all of the pregroups for supplying to the channel units thereof modulating and demodulating frequencies at opposite limits of their respective pass-bands, the frequencies so supplied to each pregroup being the same.

4. The combination as defined in claim 3 wherein the connections between the modulators and demodulators of said pregroups and the common circuits to which they connect include a hybrid having two differential circuits and a third circuit coupled to both differential circuits, said third circuits being connected to said common circuits and the pregroup units supplied by adjacent carrier frequencies being connected to different differential windings of said hybrid.

5. In a carrier frequency communication system wherein signals in a plurality of adjacent frequency bands are combined in a common circuit to produce combined signals occupying a substantially continuous spectrum, a plurality of band-pass filters each connected to pass in the same direction the frequencies in one of said adjacent bands, a common circuit adapted to pass all of the frequencies of said continuous spectrum, and means for interconnecting said filters to said common circuit comprising a hybrid having one differential circuit connected to filters passing alternate bands, a second differential circuit connected to a filter passing an intermediate band, and a circuit coupled to both of said differential circuits and connected to said common circuit.

6. In a carrier frequency communication system wherein signals in a plurality of adjacent frequency bands are combined in a common circuit to produce combined signals occupying a substantially continuous spectrum, a plurality of band-pass filters each adapted to pass the frequencies in one of said adjacent bands, a common circuit adapted to pass all of the frequencies of said continuous spectrum, and means for interconnecting said filters to said common circuit comprising a hybrid having two differential circuits and a third circuit coupled to both differential circuits and connected to said common circuit, and connections between said filters and said differential circuits, the filters passing adjacent bands being connected to different differential circuits.

References Cited in the file of this patent

UNITED STATES PATENTS

| | | |
|---|---|---|
| 1,498,568 | Osborne | June 24, 1925 |
| 1,537,255 | Mills | May 12, 1925 |
| 2,009,438 | Dudley | July 30, 1935 |
| 2,151,091 | Dudley | Mar. 21, 1939 |